United States Patent
Kieu (10) Patent No.: US 10,741,989 B2
(45) Date of Patent: Aug. 11, 2020

(54) ALL-FIBER BIDIRECTIONAL SYNCHRONOUSLY PUMPED ULTRAFAST RING OSCILLATOR FOR PRECISION SENSING

(71) Applicant: Arizona Board of Regents on Behalf of the University of Arizona, Tucson, AZ (US)

(72) Inventor: Khanh Kieu, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 71 days.

(21) Appl. No.: 15/545,763

(22) PCT Filed: Jan. 25, 2016

(86) PCT No.: PCT/US2016/014758
§ 371 (c)(1),
(2) Date: Jul. 24, 2017

(87) PCT Pub. No.: WO2016/190913
PCT Pub. Date: Dec. 1, 2016

(65) Prior Publication Data
US 2019/0103722 A1   Apr. 4, 2019
US 2019/0296516 A9   Sep. 26, 2019

Related U.S. Application Data

(60) Provisional application No. 62/107,005, filed on Jan. 23, 2015.

(51) Int. Cl.
*H01S 3/067* (2006.01)
*G01C 19/72* (2006.01)
(Continued)

(52) U.S. Cl.
CPC .......... *H01S 3/06791* (2013.01); *G01C 19/72* (2013.01); *H01S 3/0064* (2013.01);
(Continued)

(58) Field of Classification Search
CPC . G01C 19/723; G01C 19/667; H01S 3/06791; H01S 3/06758; H01S 3/1024;
(Continued)

(56) References Cited

U.S. PATENT DOCUMENTS 4,530,097 A * 7/1985 Stokes .................... G01C 19/66
356/461
4,658,401 A * 4/1987 Segre ...................... H01S 3/083
356/461

(Continued)

OTHER PUBLICATIONS

Yamauchi et al., "Specialty Fibers for Sensors and Sensor Components", 1994, SPIE Fiber Optic and Laser Sensors XII, vol. 2292, 328-339. (Year: 1994).*

(Continued)

*Primary Examiner* — Joshua King
(74) *Attorney, Agent, or Firm* — Stuart H. Mayer; Mayer & Williams PC (57) ABSTRACT

A pumped optical ring laser sensor such as a gyroscope includes a pulsed laser source to generate optical pump pulses and a synchronously pumped ring laser. The ring laser is optically pumped by first optical pump pulses from the pulsed laser source that are directed in a clock-wise (CW) direction through the ring laser and by second optical pump pulses from the pulsed laser source that are directed in a counter-clock wise (CCW) direction through the ring laser. The ring laser has an optical resonator that includes a gain medium for producing CW and CCW frequency-shifted pulses from the first and second optical pump pulses. The ring laser further includes a port for receiving the first and second pump pulses and for extracting the CW and CCW (Continued)

frequency-shifted pulses from the ring laser such that the frequency-shifted pulses overlap in time after being extracted to generate a beatnote.

29 Claims, 8 Drawing Sheets (51) Int. Cl.
H01S 3/00 (2006.01)
H01S 3/11 (2006.01)
H01S 3/16 (2006.01)
G02F 1/39 (2006.01)

(52) U.S. Cl.
CPC ........ *H01S 3/06754* (2013.01); *H01S 3/1109* (2013.01); *H01S 3/1118* (2013.01); *H01S 3/1608* (2013.01); *G02F 2001/392* (2013.01); H01S 3/0092 (2013.01)

(58) Field of Classification Search
CPC .......... H01S 3/2308–235; H01S 3/1106–1112; H01S 3/1121; H01S 3/1083; H01S 3/1086; G02F 1/39; G02F 2001/392; G02F 1/395
See application file for complete search history.

(56) References Cited

U.S. PATENT DOCUMENTS

| | | | | |
|---|---|---|---|---|
| 5,148,237 A * | 9/1992 | Schaefer | ................. | G01C 19/66 356/459 |
| 5,351,252 A * | 9/1994 | Toyama | ............... | G01C 19/727 356/461 |
| 5,363,192 A * | 11/1994 | Diels | ...................... | G01C 19/66 356/461 |
| 5,537,671 A * | 7/1996 | Toyama | ................. | G01C 19/72 356/461 |
| 6,175,579 B1 * | 1/2001 | Sandford | ............ | H01S 3/08036 372/32 |
| 6,501,591 B1 * | 12/2002 | Kumar | .................. | G02F 1/395 359/326 |
| 6,650,682 B1 * | 11/2003 | Diels | ...................... | G01C 19/66 372/25 |
| 6,958,855 B2 * | 10/2005 | Kumar | ................... | G02F 1/395 359/330 |
| 7,369,722 B2 * | 5/2008 | Yilmaz | ................. | G01C 19/72 385/1 |
| 7,372,880 B2 * | 5/2008 | Jablonski | ............... | B82Y 10/00 372/10 |
| 7,414,779 B2 * | 8/2008 | Huber | ................ | G01B 9/02069 359/333 |
| 7,876,803 B1 * | 1/2011 | Di Teodoro | .............. | G02F 1/37 372/94 |
| 7,940,816 B2 * | 5/2011 | Nicholson | ........... | H01S 3/06791 372/6 |
| 8,488,639 B1 * | 7/2013 | Diels | .................. | H01S 3/10092 372/13 |
| 9,306,363 B1 * | 4/2016 | Braga | .................... | G01B 7/003 |
| 9,772,187 B2 * | 9/2017 | Salit | ...................... | G01C 19/661 |
| 9,891,500 B1 * | 2/2018 | Chu | ...................... | G02F 1/3536 |
| 2002/0063947 A1 * | 5/2002 | Islam | .................. | H01S 3/06754 359/334 |
| 2007/0091941 A1 * | 4/2007 | Mori | .................. | H01S 3/06754 372/18 |
| 2009/0141340 A1 * | 6/2009 | Sharping | ................ | G02F 1/395 359/330 |
| 2011/0280263 A1 * | 11/2011 | Kieu | ..................... | B82Y 20/00 372/6 |
| 2012/0257270 A1 * | 10/2012 | Kuo | .................. | G02B 6/02219 359/330 |
| 2013/0293946 A1 * | 11/2013 | Fermann | ................... | G02F 1/39 359/330 |
| 2014/0320863 A1 * | 10/2014 | Christensen | .......... | G01P 15/093 356/451 |

OTHER PUBLICATIONS

Noble, "Laser Gyroscope Based on Synchronously Pumped Bidirectional Fiber Optical Parametric Oscillator", 2017, The University of Arizona College of Optical Sciences, 1-46. (Year: 2017).*

Gowda, "All-Fiber Bidirectional Optical Parametric Oscillator for Precision Sensing", 2015, The University of Arizona College of Optical Sciences, 1-46. (Year: 2015).*

* cited by examiner

ALL-FIBER BIDIRECTIONAL SYNCHRONOUSLY PUMPED ULTRAFAST RING OSCILLATOR FOR PRECISION SENSING

BACKGROUND

Rotation sensing is an important application in inertial navigation, geodesic monitoring, and fundamental research such as tests of fundamental physics. High precision rotation sensors are based on the Sagnac effect, which was discovered over a hundred years ago in an effort to prove the existence of the ether. A review of the Sagnac effect has been published in E. J. Post, "Sagnac effect," Rev. Mod. Phys. 39, 475 (1967).

There are two ways of implementing the Sagnac effect for precision rotation sensing. Passive Sagnac devices are based on interference between two counter-propagating light fields in a closed loop. The rotation response is detected as a phase shift at the output of the loop. The second implementation provides much better sensitivity and dynamic range and is known as an active Sagnac interferometer. Here, the closed loop is made into a laser cavity that helps transform the difference in phase shift experienced by the two counter-propagating optical fields (laser modes) into a frequency shift.

A popular design of an active Sagnac interferometer is based on a ring He—Ne laser, which can have a triangular or square shape (the ring laser gyroscope). These active laser gyroscopes are currently being used in highly demanding applications such as aircraft and satellite navigation. Their level of sensitivity can reach better than part-per-millions of the Earth's rate (which is about 15 degree an hour). The He—Ne laser gyroscope was developed in the early 1960's. It is a satisfactory instrument for some purposes, yet some important features are not favorable for all applications. The device can be expensive, heavy, bulky, sensitive to electromagnetic interference, and has lifetime limitations. Furthermore, these gyroscopes also suffer from the lock-in effect, which results in low sensitivity at low rotation rates.

The lock-in effect generally occurs at very low rotation rates, which is when the frequencies of the counter-propagating laser modes become almost identical. In this case, crosstalk between the counter-propagating beams can result in injection locking, so that the frequency of each beam becomes locked to one another rather than responding to gradual rotation. Although mitigation techniques have been developed such as mechanical dithering to unlock the frequencies, lock-in is still a major issue in laser-based rotation sensors that cannot be dithered.

The frequency shift detected at the output of the active laser gyroscope is proportional to the area covered by the laser cavity. For that reason, it is desirable to have as large a sensing area as possible to achieve greater sensitivity. Experiments on area scaling have been done in the last two decades by various groups, mainly in Europe. One example is the Gross Ring Laser Gyroscope that has about a 16 m$^2$ sensing area. The entire ring laser was made out of a monolithic Zerodur block to improve mechanical stability. As a result, the device can detect rotation of the earth with ultrahigh level of precision such that it has detected the earth tide, tilt, and the subtle wobbling of the earth's rotation axis over time. The biggest active laser gyroscope was developed in 2009 and featured a 39.7×21 m$^2$ (or 834 m$^2$) cavity. However, this is basically the limit of He—Ne laser technology. The large cavity is not stable enough for long term use due to the massive weight of the support structure where the cavity mirrors are mounted. Gravity pulls the heavy cavity so much that the cavity length is drifting over time and cannot be compensated.

SUMMARY

Disclosed herein is an optical ring laser sensor such as a gyroscope. The sensor includes a pulsed laser source arranged to generate optical pump pulses and synchronously pumped ring laser. The synchronously pumped ring laser is arranged to be optically pumped by first optical pump pulses from the pulsed laser source. The first optical pump pulses are directed in a clock-wise (CW) direction through the ring laser. The synchronously pumped ring laser is also arranged to be optically pumped by second optical pump pulses from the pulsed laser source. The second optical pump pulses are directed in a counter-clock wise (CCW) direction through the ring laser. The ring laser has an optical resonator that includes a gain medium for producing CW and CCW frequency-shifted pulses from the first and second optical pump pulses, respectively. The ring laser also includes a port for receiving the first and second optical pump pulses and for extracting the CW and CCW frequency-shifted pulses from the ring laser such that the CW and CCW frequency-shifted pulses overlap in time after being extracted to generate a beatnote.

In accordance with one particular aspect of the subject matter described herein, the optical ring laser sensor is an all-fiber sensor that employs a synchronously pumped, bidirectional optical parametric oscillator (BiOPO) as the synchronously pumped ring laser. The fiber-based BiOPO generates two frequency combs with identical repetition rates but different carrier offset frequencies. A narrow beatnote was observed with full-width-half-maximum (FWHM) line width of less than 10 Hz when the two frequency combs were overlapped on a photodetector. The all-fiber design advantageously removes the need for free-space alignment and adjustment. In addition, an external delay line to overlap the two pulse trains in time on the detector is not needed since this design provides automatic delay compensation.

In accordance with another aspect of the subject matter described herein, both short-term and long term drift in the beatnote can be reduced by locking one of the laser fields inside the ring laser to a stabilized optical clock (or stabilized optical frequency comb). The pulsed laser source can be stabilized using established techniques and may serve as the optical clock. In one implementation, this can be accomplished by spectrally broadening the optical spectrum of the stabilized pump beam so that it spectrally overlaps with the optical spectrum generated within the laser ring cavity. The spectrally broadened optical spectrum and one of the frequency-shifted pulse trains are then combined to generate a beatnote, which can serve as an error signal to lock the laser ring cavity to the stabilized pulsed laser source, thereby stabilizing the sensor. In some cases this technique may improve the sensitivity of the sensor by multiple orders of magnitude.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject

DETAILED DESCRIPTION

In the following description, numerous specific details are set forth in order to provide a thorough understanding of exemplary embodiments or other examples described herein. However, it will be understood that these embodiments and examples may be practiced without the specific details. In other instances, well-known methods and procedures have not been described in detail, so as not to obscure the following description. Further, the embodiments disclosed are for exemplary purposes only and other embodiments may be employed in lieu of, or in combination with, the embodiments disclosed.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As detailed below, two important challenges for active laser sensors such as gyroscopes are addressed. One challenge is to find a way to increase the sensing area in order to reach a higher level of measurement sensitivity. The other challenge is to reduce the required size and complexity of ultrasensitive laser gyroscopes and the attendant time and expense needed to build such gyroscopes. To address these challenges a rotation sensing platform has been developed that is based on fiber optics, which are advantageous for a number of reasons. For instance, the propagation loss of state-of-the-art optical fibers can be below 0.2 dB/km. This means that light can propagate through many kilometers of fiber without experiencing significant loss. Optical fibers are also lightweight, owing to their small dimension. It is thus possible to construct a very large laser cavity (orders of magnitude larger compared to current He—Ne technology) with this platform.

Active fiber lasers have been tried as rotation sensors in the past. However, the level of sensitivity was far below those employing a He—Ne laser platform. The main reason is that it is quite difficult to achieve single-frequency lasing in both directions of a long cavity fiber laser. The second reason is that the same lock-in effect that plagues free space ring lasers can be even worse in fiber due to the relatively strong Raleigh scattering, which couples the two optical fields.

One remedy for addressing the aforementioned problems is to use a pulsed laser beam instead of a continuous-wave laser beam. It is possible to build bidirectional pulsed lasers that generate two ultrashort (in the picosecond or femtosecond time scale) optical pulse trains from the clockwise (CW) and counter-clockwise (CCW) directions of the same cavity. The lock-in effect is significantly reduced when a pulsed laser is employed since the extension of the ultrashort pulses in space is small compared to the total cavity length. The first bidirectional mode-locked fiber laser was reported in 2008 where a large biased beatnote was observed at 2 MHz with about a 2 kHz line width. This laser is interesting for rotation sensing but requires some further research to establish its full potential. Our unpublished data shows that it can be quite difficult to scale the length of the cavity (or the area the cavity encompasses) much further due to complex laser dynamics.

In general, any pulsed laser source may be employed, which uses any suitable technique to generate optical pulses. For instance, directly modulated lasers or mode-locked lasers may be used in some embodiments. For purposes of illustration in the examples shown in the figures below, the active laser gyroscope or other sensor described herein will employ a mode-locked laser. In a mode-locked laser the various modes oscillate with fixed phases with respect to one another. In this way the laser modes will all periodically constructively interfere with one another, producing an intense burst or pulse of light. Such a laser is said to be mode-locked or phase-locked.

The pulsed laser source may be mode-locked by either an active mode-locking technique or a passive mode-locking technique. In active mode-locking, an external signal drives a modulator that modulates the light in the laser cavity. The modulator is typically located within the laser cavity itself. In passive mode-locking an element is placed in laser cavity which causes self-modulation of the light. For instance, in one example the element may be a saturable absorber, which has an intensity dependent transmission response. In general, passive mode-locking may be achieved using others suitable elements instead of a saturable absorber including, for instance, a semiconductor saturable absorber mirror (Sesam) or an arrangement that employs a nonlinear polarization evolution (NPE) mechanism. In the particular example shown in the figures described below, the pulsed laser source is a mode-locked laser that uses a passive mode-locking technique and the mode-locking element is a saturable absorber.

In accordance with one aspect of the subject matter described herein, a fiber laser cavity is described which avoids the complex laser dynamics associated with a gain medium having a relatively long excited state lifetime. In particular, a bidirectional mode-locked laser is presented using four-wave-mixing (FWM) in a suitable optical fiber. This gain mechanism is instantaneous so mode-locking is achieved with few complications. As previously mentioned, the design employs a mode-locked fiber laser as a pump source. Compact, low cost mode-locked fiber lasers have been developed and are currently widely available. The first solid-state bidirectional, synchronously pumped, ring optical parametric oscillator was reported in 2001, but it was based on a periodically poled lithium niobate crystal and free-space optics which hinders sensing area scaling.

In the laser gyroscope or sensor described herein the optical pulses generated by the pulsed laser source are injected into a laser ring cavity that employs a gain mechanism that translates the frequency of the optical pulses received from the pulsed laser source to a new frequency. The gain mechanism may use any of a variety of different techniques including, without limitation, optical parametric generation, Raman scattering and Brillion scattering. Other alternative gain media that may be employed include an optically pumped semiconductor gain medium (i.e., a "gain chip"), and a gas amplification medium, for example. In the particular example of the active laser gyroscope or sensor described in detail herein the gain mechanism that is employed is optical parametric generation and the laser ring cavity employing this mechanism is referred to as an optical parametric oscillator (OPO). One advantage of optical parametric generation is that it is a very fast process, being virtually instantaneous. The speed of other gain processes may be a factor in their selection.

Figure 1:
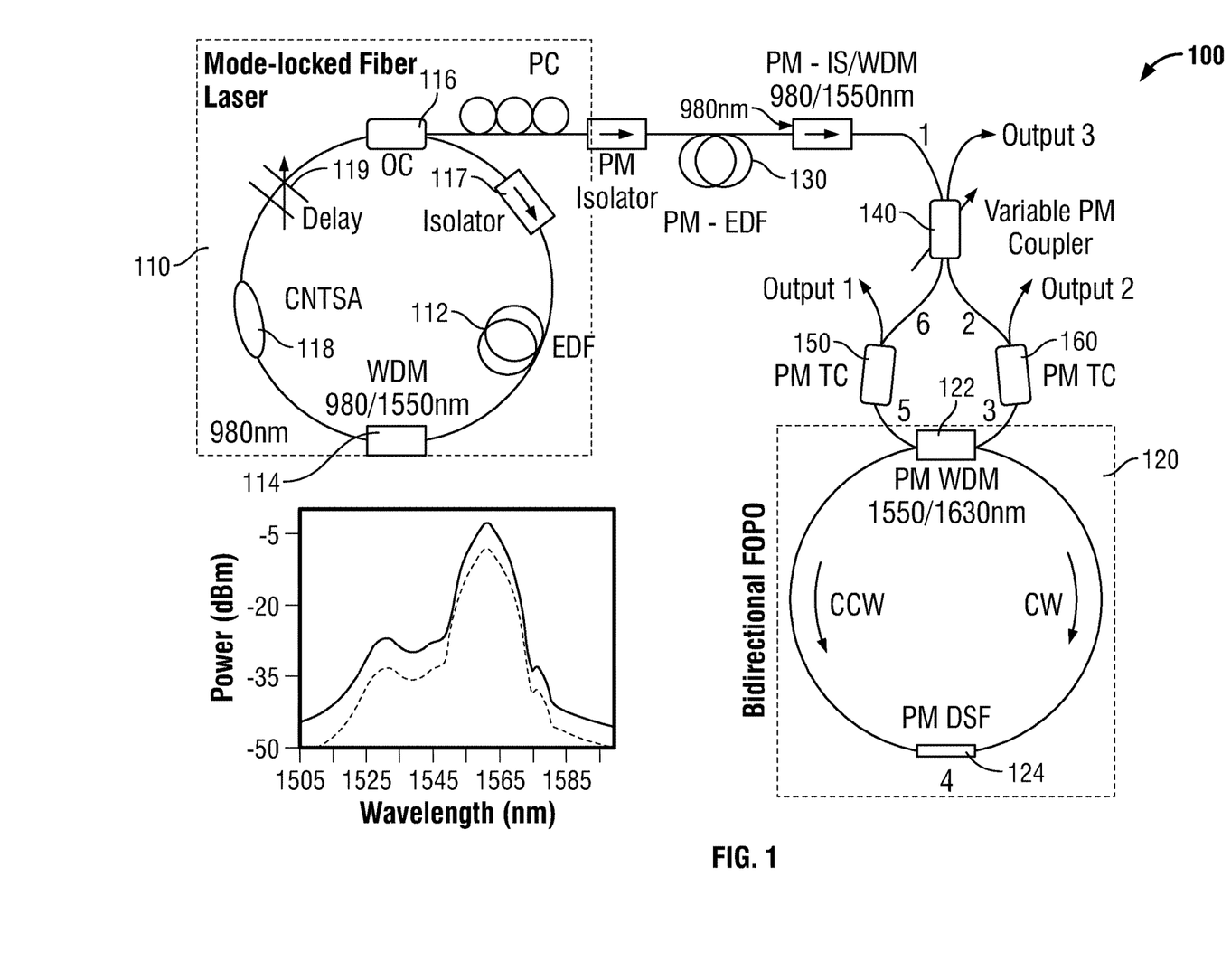
FIG. 1 shows a schematic diagram of one particular example of an active laser sensor such as a gyroscope.

FIG. 1 shows a schematic diagram of one particular example of an active laser sensor such as a gyroscope. The gyroscope 100 employs pulsed laser source 110 and laser ring cavity 120. As previously mentioned, in this example the pulsed laser source 110 is a mode-locked laser and the laser ring cavity 120 is an optical parametric oscillator. Since, as described below, the optical parametric oscillator 120 receives optical pulses trains in both the clockwise (CW) and counter-clockwise directions (CCW) and generates frequency-shifted optical pulses that travel in the CW and CCW directions, the optical parametric oscillator (OPO) is referred to herein as a bidirectional FOPO (BiFOPO).

In this example the mode-locked (ML) laser source 110 is an $Er^{3+}$-doped fiber laser operating at 1560 nm. Of course, in other embodiments ML lasers operating at other wavelengths may be employed as well. The laser source 110 has a saturable absorber 118 as the mode-locking element, and more particularly in this example, a carbon nanotube-based saturable absorber. In one illustrative embodiment the laser source 110 emits a pulse train at about a 35.8 MHz repetition rate and an average output power of about 1 mW. Optionally, the output from the ML laser source 110 may be amplified in an optical amplifier 130 such as an erbium-doped fiber amplifier (EDFA), for example. The erbium-doped fiber amplifier, as well as the remaining optical components located downstream from the optical amplifier, may be polarization maintaining if the optical pulses need to be in a single polarization state (e.g. linearly polarized) because of the gain mechanism employed in the BiFOPO. This is the case, for instance, when the gain mechanism is parametric generation, Raman scattering or Brillion scattering.

As shown in FIG. 1, the ML pulsed laser source 110 also employs various conventional components such as an erbium-doped fiber (EDF) 112, a wavelength division multiplexer (WDM) 114, an output coupler 116, an isolator 117, the aforementioned saturable absorber 118, which, as noted above, in this example is a carbon nanotubes saturable absorber (CNTSA) 118, and a delay line 119.

The BiFOPO 120 shown in FIG. 1 may employ a fused polarization maintaining (PM) 2×2 1560/1630 nm wavelength division multiplexer (WDM) 122 for injecting the optical pulses from the pulsed laser source 110 into the BiFOPO 120. The WDM 122 also serves as the output coupler for extracting signals from the BiFOPO 120. The parametric gain fiber 124 may be, for example, a polarization maintaining (PM) dispersion shifted fiber (DSF) such as those manufactured by Corning. The length of the PM DSF in this example is about 5.35 m, while the rest of the fiber is standard PM 1550 nm fiber with an anomalous dispersion of about −23 $ps^2$/km. The optical parametric generation gain element in the BiFOPO 120 is not limited to a dispersion shifted fiber, but more generally may encompass other parametric generation gain elements such as a photonic crystal fiber, a fiber taper, a liquid fiber or other elements that provide a zero dispersion wavelength that is close to the pump wavelength.

The cavities of the ML pulsed laser source 110 and the BiFOPO 120 should be synchronized with one another so that the pulse trains in the two cavities have the same repetition rate (i.e., the same separation in time between individual pulses). Cavity synchronization may be achieved by adjusting the delay line 119 which is incorporated into the cavity of the ML pulsed laser source 110. Delay lines working in the C-band are commercially available. Of course, the delay line alternatively may be located in the BiFOPO 120 instead of the ML pulsed laser source 110.

The output from the optical amplifier 130 is split in two using an optical coupler 140. As previously mentioned, if necessary for the proper operation of the BiFOPO gain mechanism, the coupler 140 may be polarization maintaining. In addition, for convenience the optical coupler 140 may be a variable coupler to ensure that an equal splitting ratio is achieved. Two tap couplers (e.g., 5% tap couplers) 150 and 160, which also may be polarization maintaining if necessary, are used to monitor the parametric lasing in the CW and CCW direction, respectively. The inset in FIG. 1 shows the pump laser spectra for the CW and CCW pulses measured at points 3 and 5, respectively. The CW curve is offset by −5 dB from the CCW spectra for better visibility.

In operation the 1560 nm pulses from the ML pulsed laser source 110 and the optical amplifier 130 (if employed) go through points 1-2-3-4-5-6-1 to pump the BiFOPO 120 in the CCW direction. Likewise, the sequence of points through which the pulses travel is 1-6-5-4-3-2-1 for the CW direction. It turns out that parametric lasing can be achieved quite easily with less than 5 mW of pump average power. Either the parametrically generated idler wavelength or signal wavelength may be chosen as the field that is on resonance with the cavity. In this example the idler wavelength was chosen to be on resonance with the cavity. The repetition rate of the idler pulse trains was identical and is defined by the pulsed laser source's repetition rate. This design resembles a Sagnac loop mirror so the pump pulses meet each other at exactly the same time on the way back after pumping the BiFOPO 120. As a result the idler pulses generated from each direction also meet each other at the same time at the point where the pump pulses are split in two (i.e., at the coupler 140). Accordingly, temporal overlap is automatically achieved. As discussed below, this is an important feature that may simplify the beatnote detection step significantly.

Figure 2A:
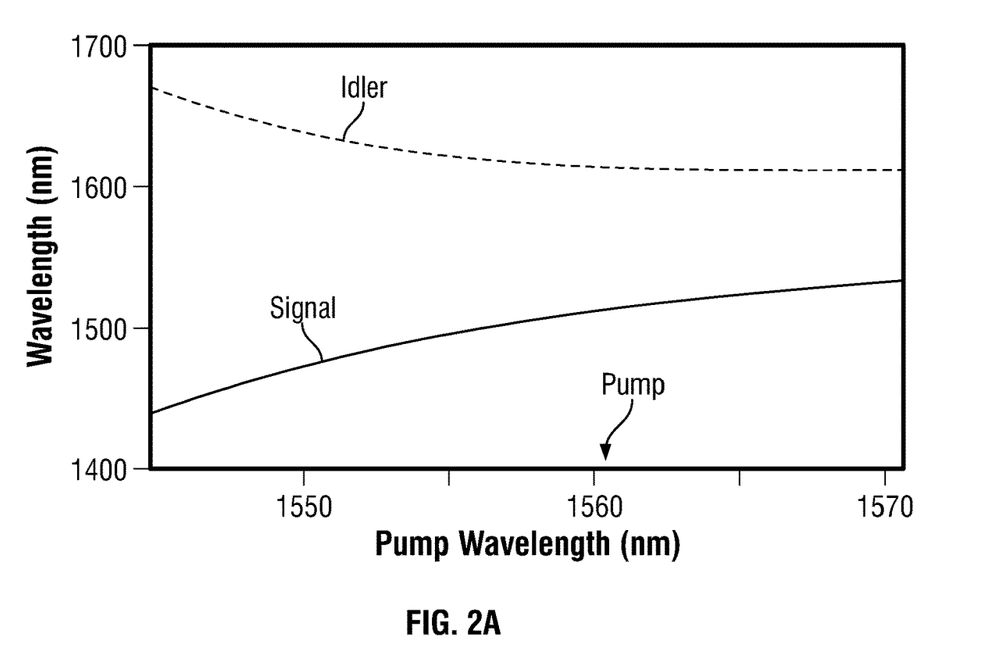
FIG. 2a shows the calculated parametric phase matching curves for the polarization maintaining (PM) dispersion shifted fiber (DSF) used in the bidirectional optical parametric oscillator (BiOPO) and FIG. 2b shows the output optical spectra from the above-threshold BiFOPO.
Figure 2B:
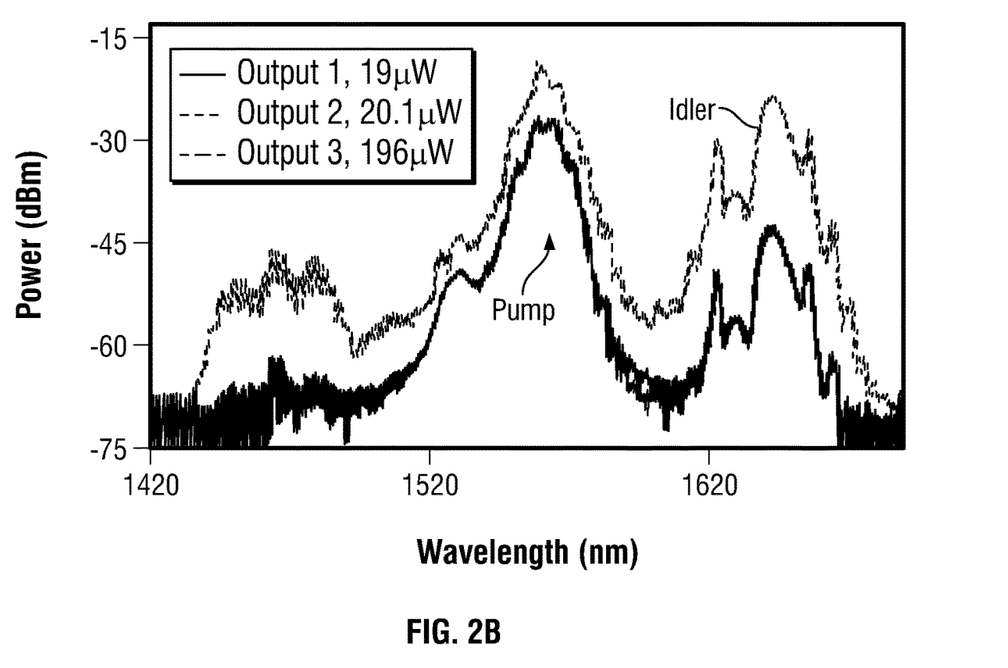

FIG. 2a shows the calculated parametric phase matching curves for the PM DSF 124. The idler wave is phase-matched at around 1620 nm when pumped at 1560 nm. FIG. 2b shows the output optical spectra from the above-threshold BiFOPO 120. The pump power was about 4.26 mW in both directions. The ratio of the idler signal over the pump power is increased at port 3 (compared to port 1 and 2) since most of the pump power is directed back to the optical amplifier 130 as a result of the Sagnac loop mirror effect. The idler signals are generated inside the cavity so they are split 50/50 at the WDM 122.

Parametric lasing in both the CW and CCW directions was observed as soon as the 1560 nm pump power in each direction was increased to greater than about 4 mW. Cavity synchronization is ensured by adjusting the delay line 119 in the ML pulsed laser source 110. The FWM phase matching condition was calculated using the dispersion profile of the PM DSF 124 and the ML pulsed laser source's pulse characteristics. The results of the calculation are shown in the parametric phase matching curves shown in FIG. 2a. The graph indicates that the idler wavelength is expected to be at around 1620 nm. The output spectra from the BiFOPO 120 shown in FIG. 2b was measured at various access points (outputs 1, 2, and 3 in FIG. 1). The estimated total cavity dispersion of the BiFOPO 120 is about $-0.014$ ps$^2$, which is in the anomalous range. For that reason, the BiFOPO 120 operates in the standard soliton regime at around 1640 nm (close to what is expected from the phase matching curve shown in FIG. 2a) with Kelly sidebands clearly visible (see FIG. 2b). The FWHM of the idler spectra (for both the CW and CCW directions) is about 8 nm, corresponding to a transform-limited pulse duration of about 400 fs. The operation of the BiOPO 120 is self-starting as soon as the pump is turned on. Bidirectional operation may be maintained for weeks without interruption.

Figure 3A:
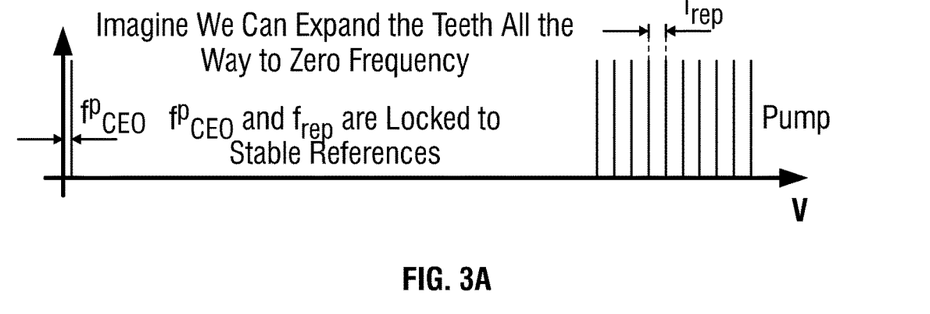
FIG. 3a shows the frequency comb generated by the pulsed laser source.
Figure 3B:
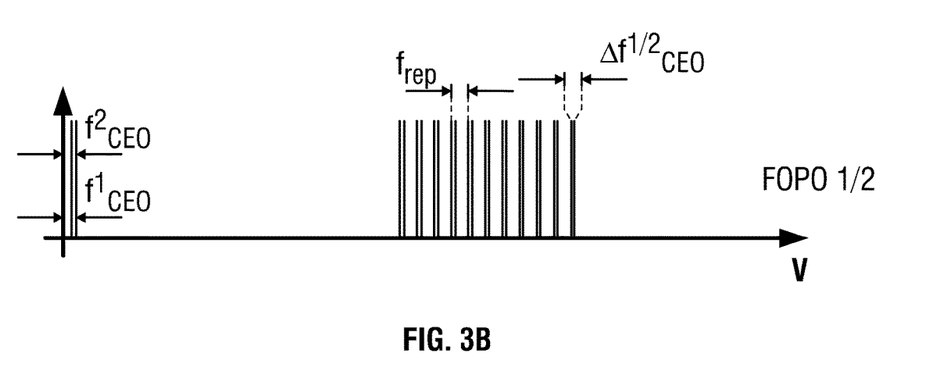
FIG. 3b shows the frequency combs of the CW and CWW idler pulses with different CEOs and FIG. 3c shows the spectra that are locked to one another when stabilizing the sensor using the arrangement shown in FIG. 7.

At this point, two idler pulse trains have been generated with identical repetition rates from the CW and CCW directions. In the frequency domain, each pulse train generated in the cavity corresponds to a frequency comb. When the repetition rates of the two pulse trains are equal, the gaps between the neighboring teeth of the combs are identical. However, the carrier frequency offsets of the combs may be different. The reason for this is the difference in the carrier-to-envelop offset (CEO) phase of the pulses. This is shown in FIGS. 3a and 3b, where FIG. 3a shows the frequency comb generated by the pulsed laser source 110 and FIG. 3b shows the frequency combs of the CW and CWW idler pulses with different CEOs.

To measure the CEO frequency difference for the two laser pulse trains they need to be overlapped in time on a photodetector. As mentioned above, the idler pulses from the CW and CCW directions are overlapped in time automatically at the output 3 due to the design of the setup, which resembles a Sagnac loop mirror. However, there is an induced temporal delay between the pump pulses and the idler pulses as they propagate through the fibers because of their different group velocities. To ensure that the pump pulses and the idler pulses overlap in time this temporal delay needs to be kept below some minimum value. In this example the estimated temporal delay is about 1.3 ps/m for standard PM fiber. Accordingly, in this example, the difference in length of the optical fiber from points 2 to 3 and from points 5 to 6 should be less than about 10 cm because the difference in group velocity for the pump light at a wavelength of 1560 nm and the idler light at a wavelength of about 1640 nm gives rise a delay difference that is comparable to the dispersion. This condition is easily met because the fiber lengths can be matched to less than 10 cm error without significant effort. Thus, to observe the CEO frequency difference beatnote the laser output (from port 3 in FIG. 1) may be applied to a detector arrangement such as a fast photodiode and an RF spectrum analyzer to visualize the frequency mixing effect.

Figure 4:
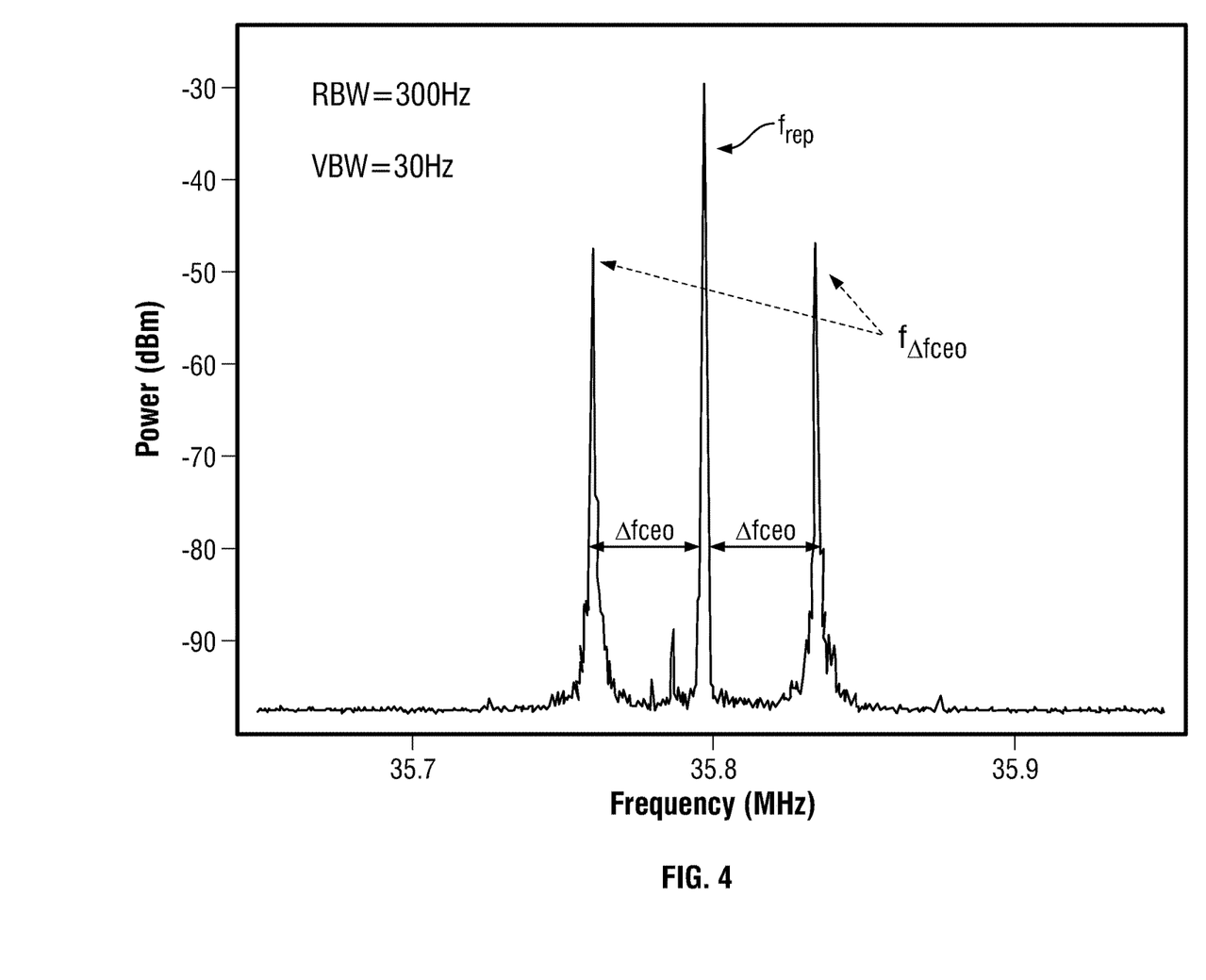
FIG. 4 shows the frequency beating that was observed when the output from the bidirectional FOPO shown in FIG. 1 was detected with a photodiode and the signal analyzed with an RF spectrum analyzer.

The result of the measurement is shown in FIG. 4, which shows the frequency beating that was observed when the output from the BiFOPO 120 was detected with a photodiode and the signal analyzed with an RF spectrum analyzer. A strong signal is observed corresponding to the repetition frequency of the laser pulse trains at about 35.8 MHz ($f_{rep}$), as expected. In addition, two strong sidebands are observed, which are symmetrically located on both sides of $f_{rep}$, which are due to the difference of the CEO frequencies of the two frequency combs. The FWHM of the $f_{\Delta ceo}$ beatnotes is about 300 Hz, which is limited by the resolution bandwidth of the RF spectrum analyzer. The $f_{\Delta ceo}$ beatnotes were observed to drift over time due to environmental noise, temperature changes in the lasing cavities, or the change of the splitting ratio of the variable coupler 140. The beatnote can be controlled by changing the coupling ratio of the variable coupler 140. This effect is explained by the power misbalance leading to an appreciable non-reciprocal nonlinear phase shift that can affect the CEO frequency difference.

The FWHM linewidth of the $f_{\Delta ceo}$ beatnotes will eventually define the sensitivity of the device for rotation sensing (or other applications such as magnetic field measurement). To accurately estimate the linewidth of the $f_{\Delta ceo}$ time-domain measurements can be used. The voltage was recorded from a slow photodiode (having about a 2 MHz bandwidth, to filter out the high frequency components) using an AC coupled digital oscilloscope.

Figure 5A:
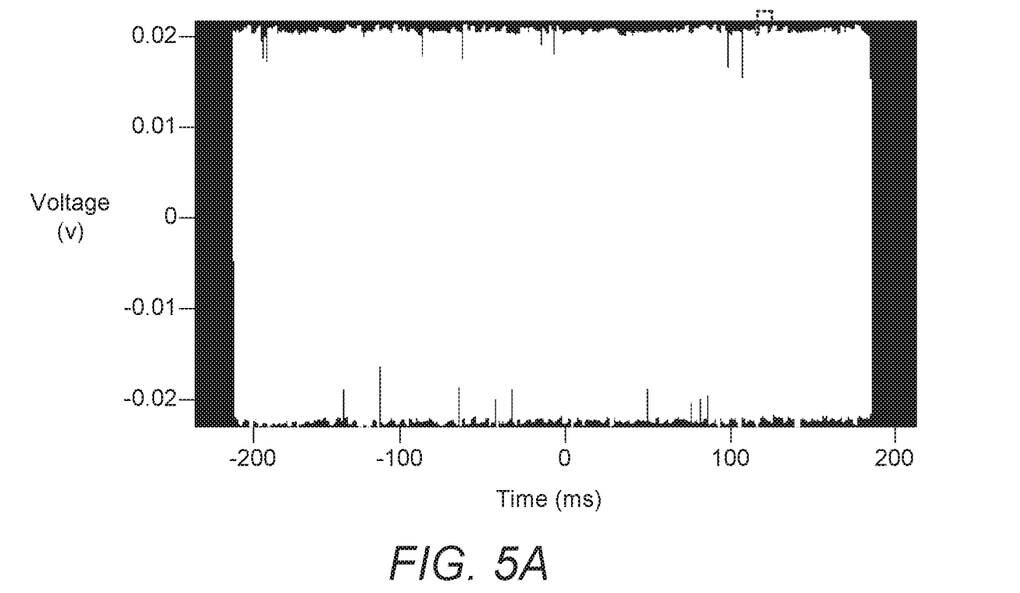
FIGS. 5a-5d show the time-domain signal resulting from the beating of the two frequency combs (generated from the bidirectional FOPO) on a slow photodiode.
Figure 5B:
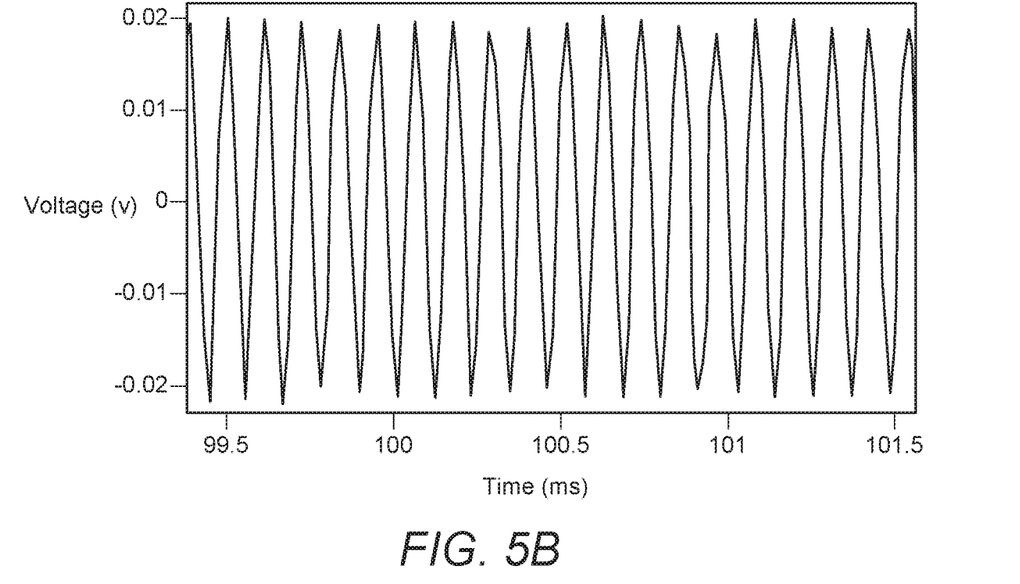
Figure 5C:
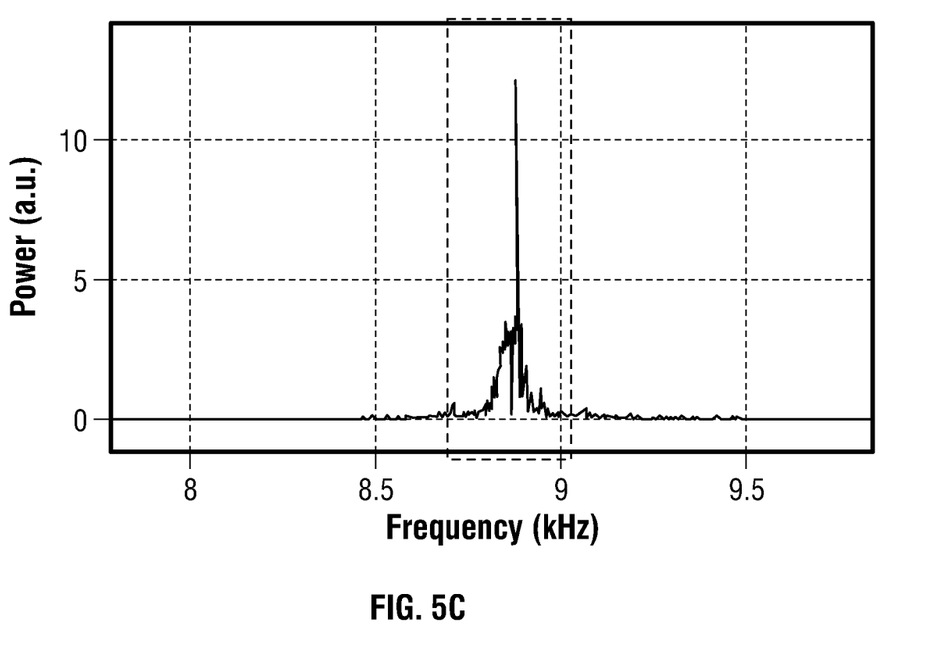
Figure 5D:
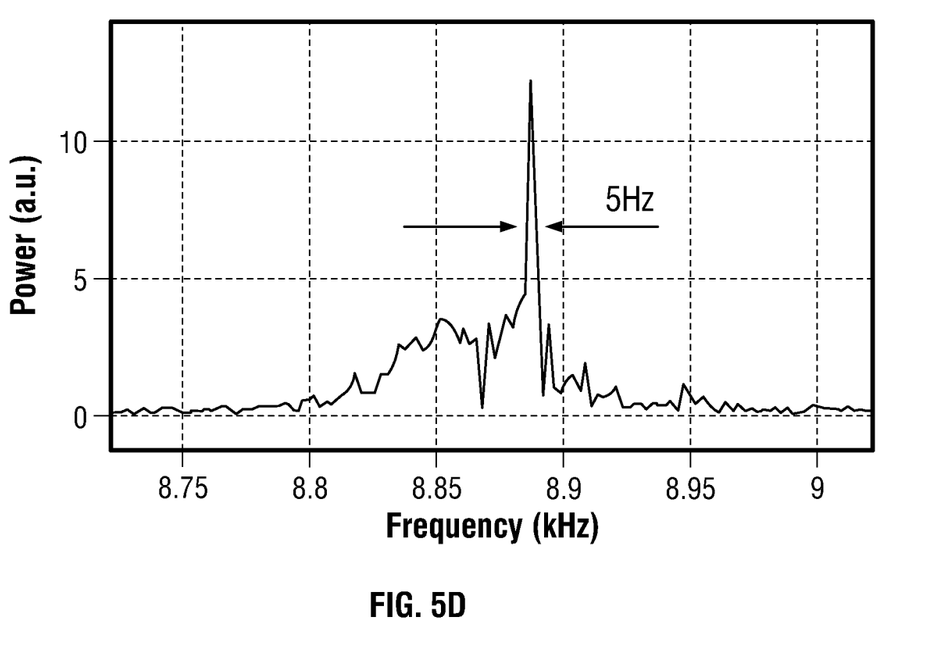

FIGS. 5a-5b shows the time-domain signal resulting from the beating of the two frequency combs (generated from the BiFOPO 120) on a slow photodiode. In particular FIGS. 5a-5b show the voltage of the signal as function of time. Likewise, FIGS. 5c-5d shows the power of the signal as a function of frequency. The measurement span is about 400 ms, which corresponds to about a 2.5 Hz resolution in the frequency domain. The sampling rate was 5 MS/s. The Fourier transform of the time domain signal reveals a narrow peak at around 8.9 kHz with about a 5 Hz FWHM linewidth. As shown, a clean sinusoidal signal is observed on the oscilloscope screen. The time-domain signal is Fourier-transformed to find the corresponding frequency shown in FIGS. 5c-5d. The resolution in the frequency domain is defined by the measurement span in time. From the data shown in FIGS. 5a-5d the FWHM of the $f_{\Delta ceo}$ beatnote was estimated to be on the order of about 5 Hz. The center frequency of the beatnote drifts over time so it was difficult to have a longer time span to accurately measure the linewidth of the $f_{\Delta ceo}$.

Drift arises because the rotation rate is determined from the beat frequency that is measured, which in turn depends on the device parameters A, P and λ, where A is the area enclosed by the laser ring cavity, P is the periphery length of the laser ring cavity and λ is the laser wavelength. In practice, all three parameters can vary with time (due to temperature fluctuation, wavelength drift, etc.), which leads to the drift in the beat frequency, and in turn in the inaccuracy in the measurement of the rotation rate. Conventional techniques to mitigate the problem with gyroscope drift include using materials with low thermal expansion such as Zerodur and isolating the laser fields from external interaction.

Figure 6A:
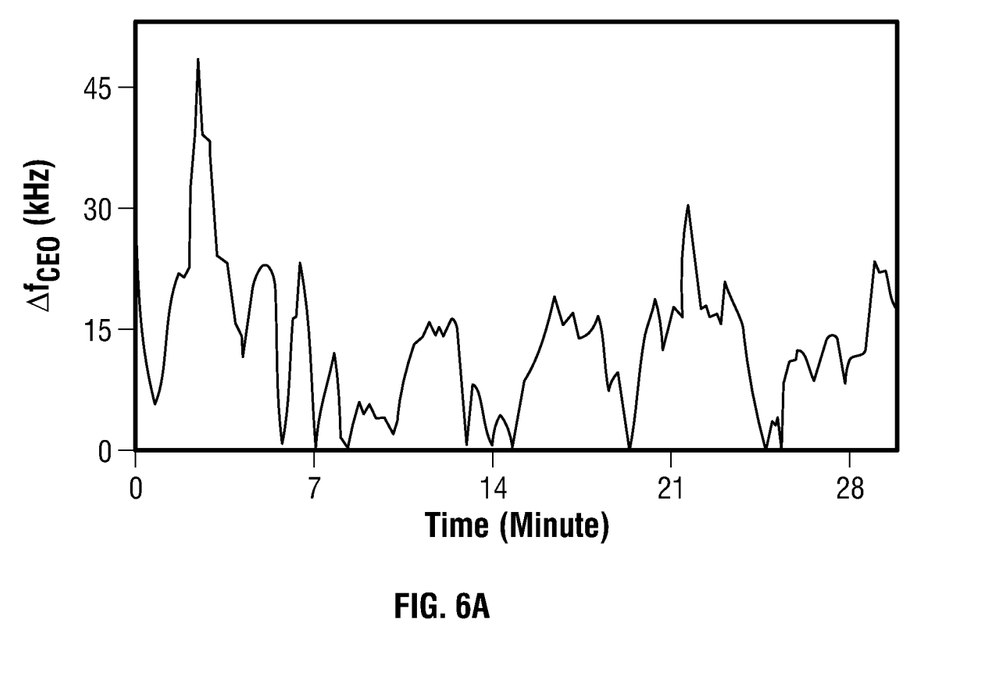
FIGS. 6a-6b shows the drift of the difference in the CEO frequencies ($\Delta f_{ceo}$) of the two combs generated from the bidirectional FOPO as a function of time.
Figure 6B:
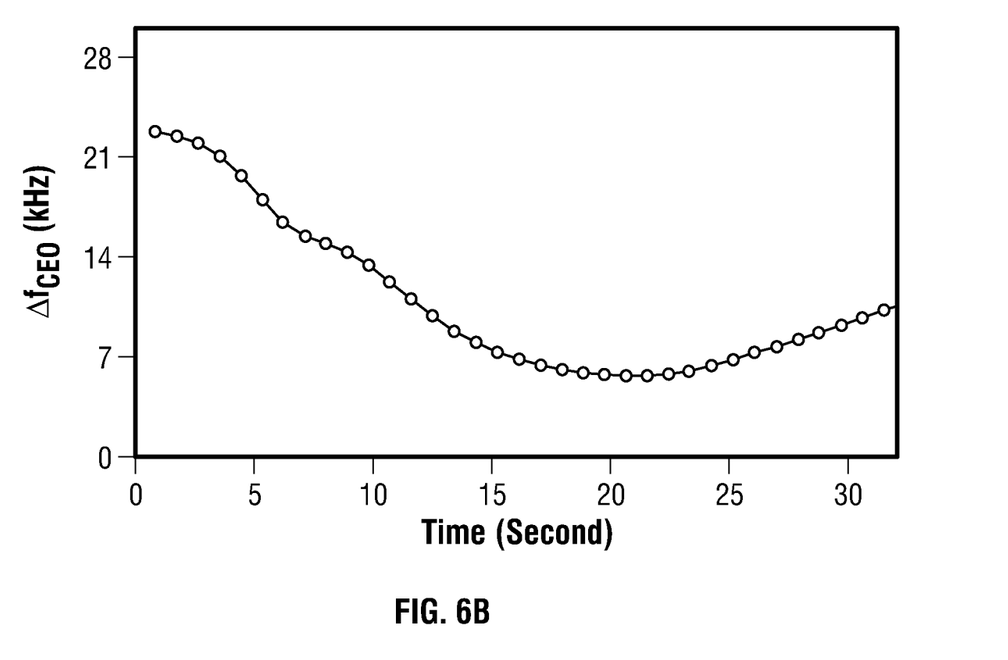

To quantify the drift of the $f_{\Delta ceo}$ beatnote over time, the center frequency of the beatnote was measured with a frequency counter. A typical result of the measurements is shown in FIGS. 6a-6b, which shows the drift of the difference in the CEO frequencies ($\Delta f_{ceo}$) of the two combs generated from the BiFOPO as a function of time. The drift is quite significant and amounts to about tens of kHz over 30 seconds. It should be noted that the illustrative system described above was not isolated from vibrations or temperature fluctuations. Moreover, the pulsed laser source 110 nor the BiFOPO 120 was stabilized. Thus, drift may be significantly reduced by better packaging the whole system better to eliminate environmental noise. In other embodiments the splitting ratio of the coupler 140 may be stabilized to ensure stable pump laser power in each direction.

The techniques described above for reducing drift are all passive means of stabilizing the device parameters on which the measured beat frequency depends. As an alternative that can potentially provide better stability, an active mechanism is described below for removing the variations in the device parameters with time by locking them using a stable source. In particular, a fully stabilized frequency comb may be used as the pulsed laser source 110 to avoid transferring the noise from the pulsed laser source 110 to the laser ring cavity 120. A fully stabilized frequency comb may be achieved by locking one of its frequencies to a stable laser field with known frequency such as a laser field tightly locked to a narrow atomic transition. In this way the pulsed laser source 110 functions as a stable optical clock. Stable optical clocks based on mode-locked lasers have been developed in recent years. They represent a new class of highly precision clock with outstanding performance reaching the $10^{-19}$ level. Next, once the frequency comb is stabilized, one of the laser fields in the laser ring cavity 120 can be locked to one of the frequencies in the frequency comb generated by the pulsed laser source 110, thereby stabilizing the laser gyroscope sensor.

Figure 3C:
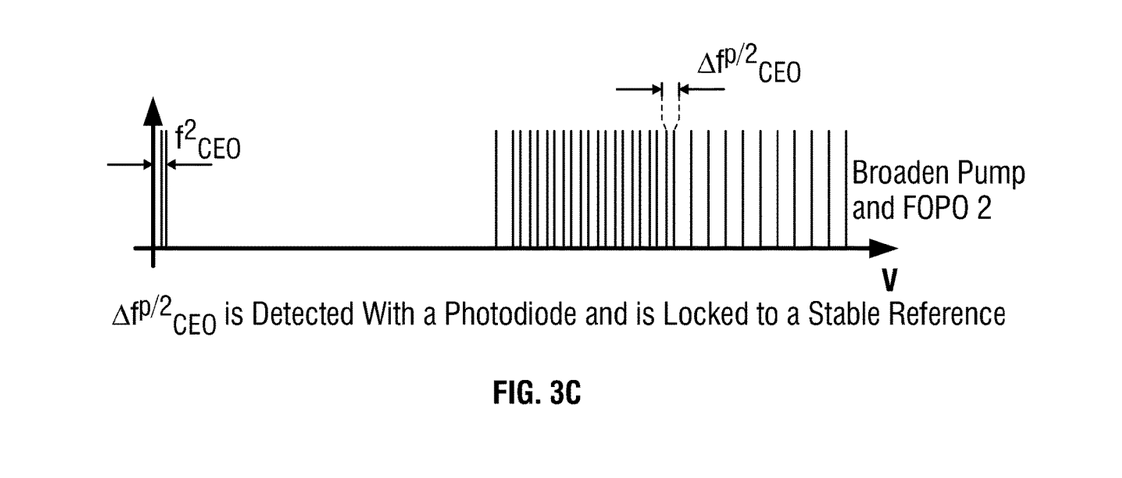
Figure 7:
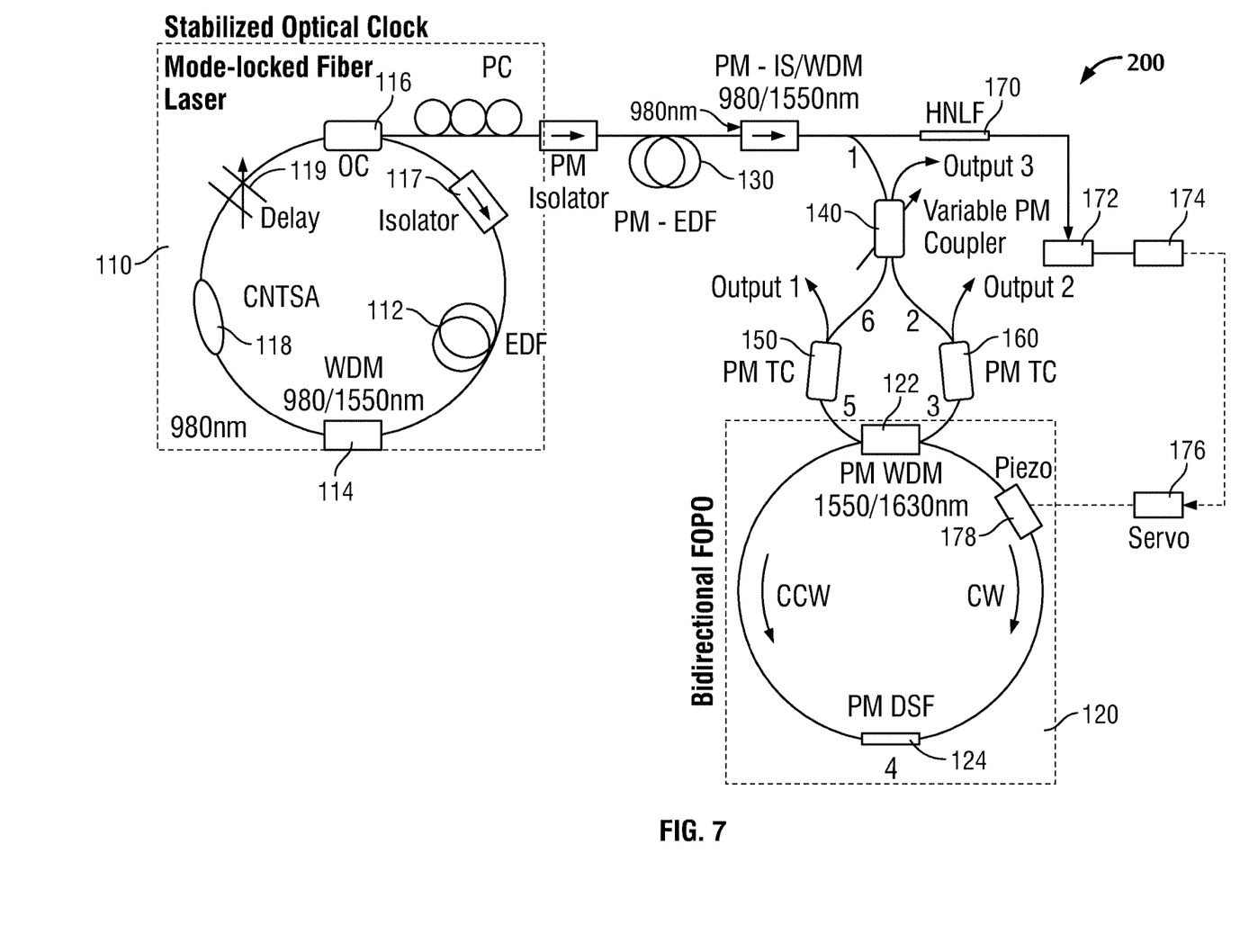
FIG. 7 shows a schematic diagram of an active laser gyroscope that incorporates an active stabilization arrangement to reduce drift.

FIG. 7 shows a schematic diagram of an active laser gyroscope 200 similar to the example shown in FIG. 1, except that it incorporates an active stabilization arrangement to reduce drift. In FIGS. 1 and 7 like elements are denoted by like reference numerals. In this example the pulsed laser source 110 is assumed to be stabilized in accordance with any of a wide variety of well-known techniques. As shown, a portion of the stabilized pump beam is split off downstream from the optical amplifier 130 (if employed) and is spectrally broadened using, for example, a highly nonlinear fiber (HNLF) 170 so that its optical spectrum overlaps with the optical spectrum generated by the laser ring cavity 120 (which is around 1620 nm for the BiFOPO shown in this example). Next, the broadened pump spectrum is combined with the output from one direction of the laser ring cavity 120. In this example broadened pump spectrum is combined by an optical coupler 172 from output 2. The resulting optical spectrum is shown in FIG. 3c. The combined signal is then detected by a photodiode 174 to find a beatnote between the fields of the broadened pump spectrum and the output from the laser ring cavity 120. The beatnote can then serve as an error signal to lock the laser ring cavity 120 to the optical frequency comb of the pulsed laser source 110. In particular, a servomechanism 176 receives the beatnote signal from the photodetector 174 and, based on the beatnote signal, adjusts a piezoelectric actuator 178 or the like that is included in the optical path of the laser ring cavity 120. In this way the path length of the laser cavity 120 can be adjusted to minimize the error signal and thus lock the laser ring cavity 120 to the stabilized optical frequency comb of the pulsed laser source 110, thereby stabilizing the laser gyroscope or sensor.

In summary, in one embodiment an all-fiber, synchronously pumped, bidirectional optical parametric oscillator has been described for use as a gyroscope or other sensor. The BiFOPO generates two highly coherent frequency combs with identical repetition rates but slightly different CEO frequencies. The line width of the beatnote between the two frequency combs was found to be very narrow, on the order of less than 10 Hz, indicating the great potential of the system for precision measurements. One advantage of the BiFOPO or other laser ring cavity is the possibility to scale up the sensing areas by orders of magnitude compared to the He—Ne laser gyroscope technology. It should be noted that the area of the BiFOPO can be scaled up without the need to change the repetition rate (or the cavity length) of the pump laser since there can be N pump pulses in the BiOPO cavity at a time, where N is a non-zero integer. The BiFOPO can be used, for example, for intracavity phase interferometry (IPI) where a large number of other physical quantities (nonlinear refractive index, acceleration, magnetic field, etc.) can be measured with great precision.

The above description of illustrated examples of the present invention is not intended to be exhaustive or limited to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

The invention claimed is:

1. A pumped optical ring laser sensor, comprising:
   a pulsed laser source arranged to generate optical pump pulses;
   a synchronously pumped ring laser being arranged to be optically pumped by first optical pump pulses from the pulsed laser source that are directed in a clock-wise (CW) direction through the ring laser and by second optical pump pulses from the pulsed laser source that are directed in a counter-clock wise (CCW) direction through the ring laser, the ring laser having an optical resonator that includes a gain medium for producing CW and CCW frequency-shifted pulses from the first and second optical pump pulses, the ring laser further including a port for receiving the first and second optical pump pulses and for extracting the CW and CCW frequency-shifted pulses from the ring laser such that the CW and CCW frequency-shifted pulses overlap in time after being extracted to generate a beatnote;
   wherein each of the CW and CCW frequency-shifted pulses correspond to a frequency comb in a frequency domain, the frequency combs having the same repetition rate and different carrier offset frequencies; and an arrangement for locking a frequency of the frequency shifted pulses to a stabilized frequency comb associated with the optical pump pulses to a stable source.

2. The pumped optical ring laser sensor of claim 1, wherein the gain medium employs a Raman amplification process.

3. The pumped optical ring laser sensor of claim 1, wherein the gain medium includes a solid-state medium.

4. The pumped optical ring laser sensor of claim 1, wherein the gain medium includes a gas medium.

5. The pumped optical ring laser sensor of claim 1, wherein the gain medium employs a parametric generation process and the ring cavity is a fiber optic parametric oscillator (FOPO).

6. The pumped optical ring laser sensor of claim 5, wherein the pulsed laser source is a fiber coupled laser source.

7. The pumped optical ring laser sensor of claim 1, wherein the pulsed laser source is a directly modulated laser source.

8. The pumped optical ring laser sensor of claim 6, wherein the pulsed laser source is a mode-locked (ML) laser source.

9. The pumped optical ring laser sensor of claim 8, wherein the mode-locked (ML) laser source employs an active mode-locking mechanism.

10. The pumped optical ring laser sensor of claim 8, wherein the mode-locked (ML) laser source employs a passive mode locking mechanism.

11. The pumped optical ring laser sensor of claim 8, wherein the mode-locked laser is mode-locked by a saturable absorber.

12. The pumped optical ring laser sensor of claim 11, wherein the saturable absorber is a carbon nanotube saturable absorber.

13. The pumped optical ring laser sensor of claim 5, further comprising a splitter for splitting the optical pump pulses provided by the mode locked laser into the first and second optical pump pulses that pump the FOPO.

14. The pumped optical ring laser sensor of claim 13, wherein the extracted CW and CCW frequency-shifted pulses overlap in time at the splitter.

15. The pumped optical ring laser sensor of claim 13, wherein the splitter is a 50-50 splitter.

16. The pumped optical ring laser sensor of claim 5, wherein the CW and CCW frequency-shifted pulses are idler pulses.

17. The pumped optical ring laser sensor of claim 5, wherein the CW and CCW frequency-shifted pulses are signal pulses.

18. The pumped optical ring laser sensor of claim 5, further comprising an optical amplifier for amplifying the optical pulses provided by the pulsed laser source before the optical pump pulses are directed to the fiber optic parametric oscillator.

19. The pumped optical ring laser sensor of claim 18, wherein the optical amplifier is a polarization maintaining optical amplifier.

20. The pumped optical ring laser sensor of claim 15, wherein the gain medium employing a parametric generation process is a nonlinear fiber portion.

21. The pumped optical ring laser sensor of claim 20, wherein the nonlinear fiber portion includes a dispersion shifted optical fiber.

22. The pumped optical ring laser sensor of claim 21, wherein the dispersion shifted optical fiber is a polarization maintaining dispersion shifted optical fiber.

23. The pumped optical ring laser sensor of claim 1, wherein at least one of the pulsed laser source and the laser cavity includes a delay line for synchronizing the optical pump pulses with the frequency-shifted pulses.

24. The pumped optical ring laser sensor of claim 1, wherein the port for receiving the first and second optical pump pulses and for extracting the CW and CCW frequency-shifted pulses includes a wavelength division multiplexer (WDM).

25. The pumped optical ring laser sensor of claim 1, further comprising a servomechanism-based arrangement for reducing drift in the beatnote by locking the beatnote to a frequency in the frequency comb associated with the optical pump pulses generated by the pulsed laser source.

26. The pumped optical ring laser sensor of claim 25, wherein the servomechanism-based arrangement comprises:
an optical element for spectrally broadening a portion of a light beam generated by the pulsed laser source, the light beam portion being sufficiently broadened so that its optical spectrum overlaps with an optical spectrum of light generated in the ring laser;
an optical combining element for combining the spectrally broadened light beam portion with a portion of shifted light extracted from the ring laser to produce a second beatnote;
a photodetector for detecting the second beatnote and generating a signal in response thereto;
an actuator for adjusting a path length of a cavity of the ring laser; and
a servomechanism receiving the signal from the photodetector and selectively adjusting the actuator in response to the signal.

27. A method for measuring a rotation rate, comprising:
pumping an optical resonator of a fiber ring laser in both a CW and CCW direction with optical pulse trains that correspond to a frequency comb in the frequency domain, the frequency combs having the same repetition rate and different carrier offset frequencies;
in the optical resonator, translating a frequency of the optical pulse trains with a gain medium;
extracting the CW and CCW frequency-translated pulses from the optical resonator such that the CW and CCW frequency-translated pulses overlap in time after being extracted to generate a beatnote;
detecting the beatnote; and
deriving a rotation rate based at least in part on the detected beatnote.

28. The method of claim 27, further comprising generating the optical pulse trains with the same mode-locked fiber laser.

29. The method of claim 27, wherein the gain medium employs a parametric generation process and the ring cavity is a fiber optic parametric oscillator (FOPO).

* * * * *